(12) United States Patent
Salsedo et al.

(10) Patent No.: US 12,343,868 B2
(45) Date of Patent: Jul. 1, 2025

(54) MECHANICAL TRANSMISSION FOR ROBOTIC DEVICES

(71) Applicant: WEARABLE ROBOTICS S.r.l., San Giuliano Terme (IT)

(72) Inventors: Fabio Salsedo, San Giuliano Terme (IT); Alessandro Filippeschi, San Giuliano Terme (IT)

(73) Assignee: WEARABLE ROBOTICS S.r.l., San Giuliano Terme (IT)

( * ) Notice: Subject to any disclaimer, the term of this patent is extended or adjusted under 35 U.S.C. 154(b) by 0 days.

(21) Appl. No.: 18/260,784

(22) PCT Filed: Jan. 26, 2022

(86) PCT No.: PCT/IB2022/050662
§ 371 (c)(1),
(2) Date: Jul. 8, 2023

(87) PCT Pub. No.: WO2022/162540
PCT Pub. Date: Aug. 4, 2022

(65) Prior Publication Data
US 2024/0058947 A1  Feb. 22, 2024

(30) Foreign Application Priority Data
Jan. 27, 2021 (IT) .................. 102021000001652

(51) Int. Cl.
*B25J 9/10* (2006.01)
*B25J 9/00* (2006.01)

(52) U.S. Cl.
CPC ............ *B25J 9/104* (2013.01); *B25J 9/0006* (2013.01)

(58) Field of Classification Search
CPC ......... B25J 9/104; B25J 9/0006; B25J 9/1045
See application file for complete search history.

(56) References Cited

U.S. PATENT DOCUMENTS 2,854,854 A  10/1958  Rappaport et al.
4,761,114 A *  8/1988  Barland ............... B25J 17/0283
901/29

(Continued)

FOREIGN PATENT DOCUMENTS

EP         2 492 545 A1    8/2012
WO   WO 2004/058458 A1    7/2004

(Continued)

*Primary Examiner* — Thomas C Diaz
(74) *Attorney, Agent, or Firm* — ASLAN LAW, P.C.

(57) ABSTRACT

A transmission element intended to be diverted between an input and output direction, an input pulley rotating around a first axis of rotation orthogonal to the input direction and partly wrapped by the transmission element, an output pulley rotating around a second axis of rotation orthogonal to the output direction and partly wrapped by the transmission element, the second axis of rotation being non-parallel to the first axis of rotation. The first and second axis of rotation form between them a deflection angle having predefined width, an intermediate pulley positioned between the input and output pulley and configured to rotate around a third axis of rotation, and inclined with respect to one of the axes of rotation by an angle having smaller width than the width of the deflection angle, and partly wrapped by the transmission element. The planes of rotation of the pulleys are non-parallel.

6 Claims, 6 Drawing Sheets

(56) References Cited

U.S. PATENT DOCUMENTS

| | | | | |
|---|---|---|---|---|
| 4,903,536 | A | * | 2/1990 | Salisbury, Jr. ........ F16H 19/005 74/89.22 |
| 7,762,156 | B2 | * | 7/2010 | Chang ..................... B25J 9/104 74/490.06 |
| 8,924,009 | B2 | * | 12/2014 | Salisbury ........... G05G 9/04737 901/14 |
| 2010/0256815 | A1 | | 10/2010 | Salisbury et al. |
| 2012/0198952 | A1 | * | 8/2012 | Mamba ................ F16H 19/005 74/96 |
| 2015/0202780 | A1 | | 7/2015 | Wang |

FOREIGN PATENT DOCUMENTS

| | | |
|---|---|---|
| WO | WO 2008/131563 A1 | 11/2008 |
| WO | WO 2013/186701 A1 | 12/2013 |
| WO | WO 2017/216663 A1 | 12/2017 |

\* cited by examiner

MECHANICAL TRANSMISSION FOR ROBOTIC DEVICES

CROSS-REFERENCE TO RELATED APPLICATIONS

This application claims priority to IT patent application No. 102021000001652 filed on Jan. 27, 2021, and this application claims priority to and is a 371 of international PCT Application No. PCT/IB2022/050662 filed on Jan. 26, 2022, the entire contents of which are hereby incorporated by reference.

TECHNICAL FIELD

The present invention relates to a mechanical transmission for robotic devices. In particular, it relates to a mechanical transmission wherein the input and output axes of the pulleys making up the mechanical transmission are not parallel to each other.

The present invention finds a preferred, but not exclusive, application in the field of robotic devices, and in particular those which physically interact with human beings such as collaborative robots and actuated exoskeletons. The latter are characterized by complex kinematics capable of mimicking human articulations in order to provide physical assistance to the user's movements.

BACKGROUND ART

Such devices are usually provided with a plurality of articulations connected to each other by means of rigid parts (or otherwise called "links"). These articulations allow the relevant motion, even with multiple degrees of freedom, between the links by means of rotoidal or prismatic joints. In particular, in a robotic device we can identify:
 fixed (or base) link: usually connected to a base frame;
 end link: usually connected to an end effector adapted to perform a specific activity, such as e.g. gripping objects;
 intermediate links between the base link and the end link.

One or more actuators connected to the joints by means of appropriate mechanical drives are used to move the articulations in space and to generate torques and/or interaction forces with the external environment. Usually, the actuators are placed directly at the joints to be moved, causing, however, problems in terms of space and weight of the so-called mobile links, i.e. end and intermediate links.

Therefore, the realization of drive systems is well known which allow placing the actuators on the fixed link (called in jargon "remotization") in order to reduce the space and the masses/inertias of the mobile links, with obvious benefits in terms of dynamic performance of the robotic device and safety of the operators positioned inside its workspace or physically interacting therewith (e.g. in the case of collaborative robots or actuated exoskeletons). In addition, this solution implies a reduction in the torque requirements of some actuators, mainly those close to the fixed link, since the latter do not have to support the weight and inertia of the other actuators arranged on the links downstream thereof.

However, the remotization of the actuators requires the realization of "long" mechanical drives capable of transmitting the torque/force generated by each actuator to the relevant joints to be moved. These drives must therefore cross the articulations between the joint to be actuated and the actuator, by following and accompanying them throughout the entire width of their movements.

There are various solutions for the manufacture of long mechanical drives.

A first known solution involves the use of gear wheels coupled to drive shafts. However, these components, in addition to being characterized by a significant weight, require tight machining tolerances to ensure low operating friction and clearance, with unfortunate increase in the production costs.

Another well-known solution involves the use of a system of gear belts and/or chains. However, this type is also very inconvenient as it is characterized by fluctuations in the transmission ratio.

Another solution involves the use of cables guided by flexible sheaths (the so-called "bowden cables") which, thanks to their flexibility, are able to follow the movements of the links. Nevertheless, these mechanical drives do have several drawbacks, as they require enough space in order not to force the sheaths to take on excessive curvature at the limit postures reached by the robotic device. On the other hand, these drives are also characterized by non-negligible friction that varies according to the curvature taken by the sheaths during the movement of the articulations. Moreover, the variation of the sheaths curvature and of the cable tension can generate clearances in the drive, mainly due to the change of the cable surfaces in contact with the guiding sheath.

For at least the aforementioned reasons, the solution providing for the use of taut cables is more effective, as it allows creating mechanical drives able to cross even complex articulations with relative ease (such as, e.g., those with non-parallel axes) and able to transmit relatively high forces and powers with high stiffness, zero clearance and very low friction.

In the present case, a drive with taut cable is usually provided with a cable, a driving pulley, a driven pulley and possible idle pulleys. The driving pulley receives a predetermined torque from the actuator so that a traction force is exerted on the cable to move it. The idle pulleys divert the direction of the cable appropriately in its internal portions to the links and at the articulations to allow the movement thereof. The driven pulley receives the force transmitted by the cable and applies the relevant torque on the joint to be actuated.

Since the taut cable can only transmit traction forces, in order to generate torques in both directions, it is necessary for the taut cable to make a closed circuit provided with a forward branch and a return branch.

Such bidirectional drives with a taut cable are normally provided with means for pre-tensioning (or also called pre-loading) the cable in order to prevent excessive slack in the unloaded branch which could cause it to slip off the pulleys (i.e., the cable to escape from the guiding surface thereof). Furthermore, in order to keep the preload value constant, it is necessary that the overall length of the closed circuit remains constant as the postures of the robotic device change. Consequently, the mechanical transmissions required to cross the articulations must ensure that the length of the circuit is unvaried. A possible solution to achieve this condition is to wrap both the forward branch and the return branch on idle pulleys having axes coinciding with the axes of rotation of the articulation (see FIG. 1), thus ensuring that both branches are in contact with these pulleys in all the postures reached by the device.

There are different types of transmissions for taut cables. In this case, it is possible to define transmissions of the first type and transmissions of the second type.

The transmission of the first type is, e.g., a transmission in which the cable deflection occurs on a single plane with partial wrapping around one or more pulleys with axes of rotation which are parallel to each other.

Figure 1:
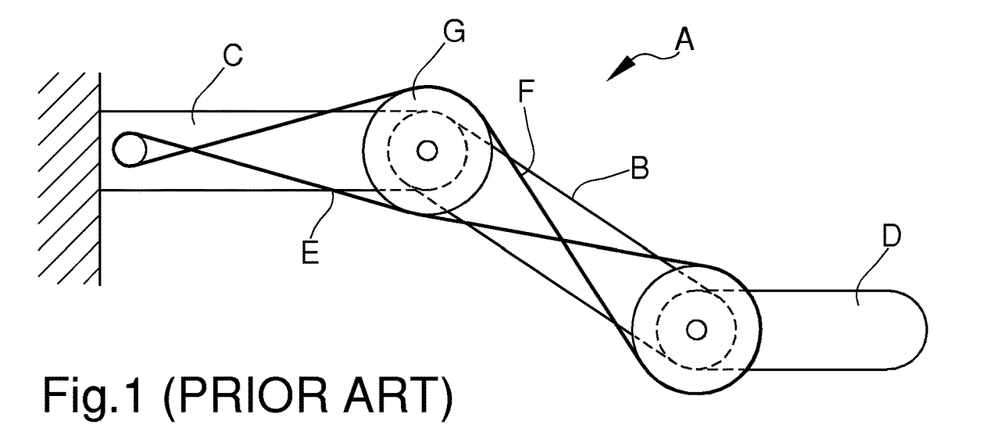
FIGS. 1, 2 and 3 are schematic views of some solutions of the prior art.

FIG. 1 shows an example of a transmission of the first type employed inside a generic robotic device A with two parallel-axis rotational degrees of freedom. In particular, the device A is provided with an intermediate link B connected, at its ends, to a base link C and to an end link D by means of a first and a second rotoidal torque, respectively, having axes of rotation parallel to each other.

The device A is also provided with a bidirectional drive with a taut cable, in which a forward branch E and a return branch F necessary to transmit the torque in both directions are identified, and an idle pulley G arranged with its axis of rotation coinciding with the axis of the first rotoidal torque, in order to ensure invariance of the length of the circuit of the taut cable.

From the FIG. 1 it can be ascertained that the wrapping angle of the forward branch on the idle pulley G is relatively small and that an additional rotation in the clockwise direction of the intermediate link B would produce the detachment of the cable from the idle pulley G, no longer ensuring the condition of constancy of the cable circuit length. In order to increase the permissible angular range of the intermediate link B, additional idle pulleys may be used with axes of rotation locked together with the base link C and/or with the intermediate link B and suitably positioned so as to increase the wrapping angle(s) of the branch(es) of the driving cable.

On the contrary, the transmissions of the second type are those transmissions which cross articulations with two or more degrees of freedom whose axes are, generally speaking, not parallel. In this case, the circuit made by the taut cable is not contained in a single plane.

For the transmission of the second type, the deflection angle can be defined as the angle comprised between the axis of rotation of the input pulley and the axis of rotation of the output pulley.

In a transmission of the second type with axes of rotation of the input pulley and output pulley incidental to each other, a gap is defined as the minimum distance between the lateral surfaces of the adjacent pulleys. It is actually necessary that this gap is greater than zero in order to avoid that, due to machining tolerances and deformations induced by the operating loads, the pulleys come into contact and generate coaction forces.

Transmissions with incidental axes are particularly known in which the axes of rotation of the pulleys intersect at a point called the "center of the transmission".

For example, a transmission of the second type is described in U.S. Pat. No. 4,903,536A having a pair of pulleys with incident axes of rotation. The transmission is configured to deflect the taut cable by a 90° deflection angle through its partial wrapping between the pulleys.

Figure 2:
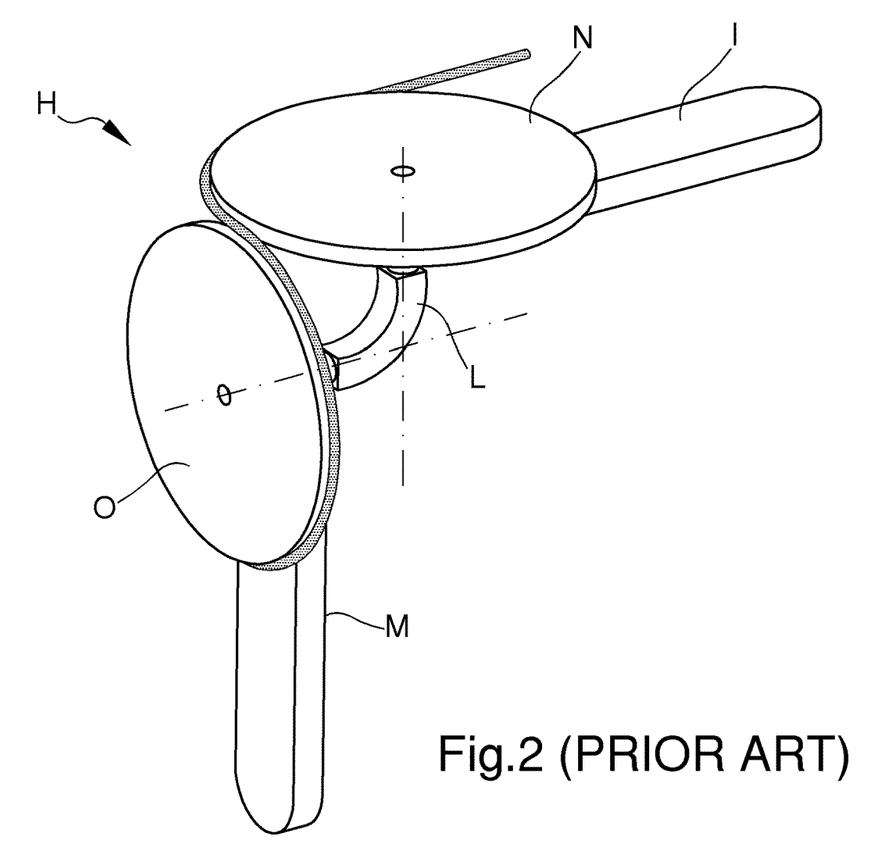

FIG. 2 shows an example of a transmission of the second type with incident axes H, according to a known solution, usable in a robotic device having a basic link I connected, by means of an intermediate link L, to an end link M. The intermediate link L is connected to the base link I and to the end link M by means of a first and a second rotoidal torques, respectively, the latter being arranged with the axes incident and orthogonal to each other. Thus, the transmission H, therefore, comprises a first idle pulley N arranged with its axis of rotation coincident with the axis of the first rotoidal torque and a second driven pulley O arranged with its axis of rotation coincident with the axis of the second rotoidal torque.

The implementation of the transmission by means of pulleys forces the cable path to substantially deviate from the straight line, corresponding to its configuration of minimum potential energy and which, however, would lead to escape from the pulleys. According to the prior art, the slipping off the pulleys can be prevented by ensuring that the gap is of a smaller size than the diameter of the cable.

However, the force exerted by the driving cable on the pulleys at the gap may cause the value thereof to increase, resulting in the cable slipping off the pulleys towards the inside of the transmission. This, in turn, results in the loss of functionality of the drive as well as a potentially dangerous situation for the user's safety.

In order to limit this drawback, it is necessary to adequately strengthen the supporting elements of the pulleys, with a consequent increase in the overall dimensions and cost of the entire transmission.

It would be more effective to prevent the cable from slipping off the pulleys towards the center of the transmission by using pulleys fitted with retaining elements, such as e.g. a groove formed along the lateral surface of the pulley, characterized by such a geometry so as to prevent the cable from displacing in a direction parallel to the axis of rotation of the pulley.

However, in the transmissions of the second type made according to the prior art, this solution has some limitations linked to the fact that the cable, in order to pass from one pulley to another, needs a space of freedom wherein it cannot be supported by any retaining element. In actual fact, a retaining element formed on a pulley cannot occupy the space needed by the cable to pass from one pulley to another, thus making it impossible to fit pulleys with retaining elements that prevent the cable from slipping off the pulleys towards the center of the transmission.

For example, in the case of deflection angles equal to or greater than 90 degrees, this solution cannot be used. In fact, the cable, in passing from one pulley to another, would interfere with these retaining elements as shown in FIG. 3.

Figure 3:
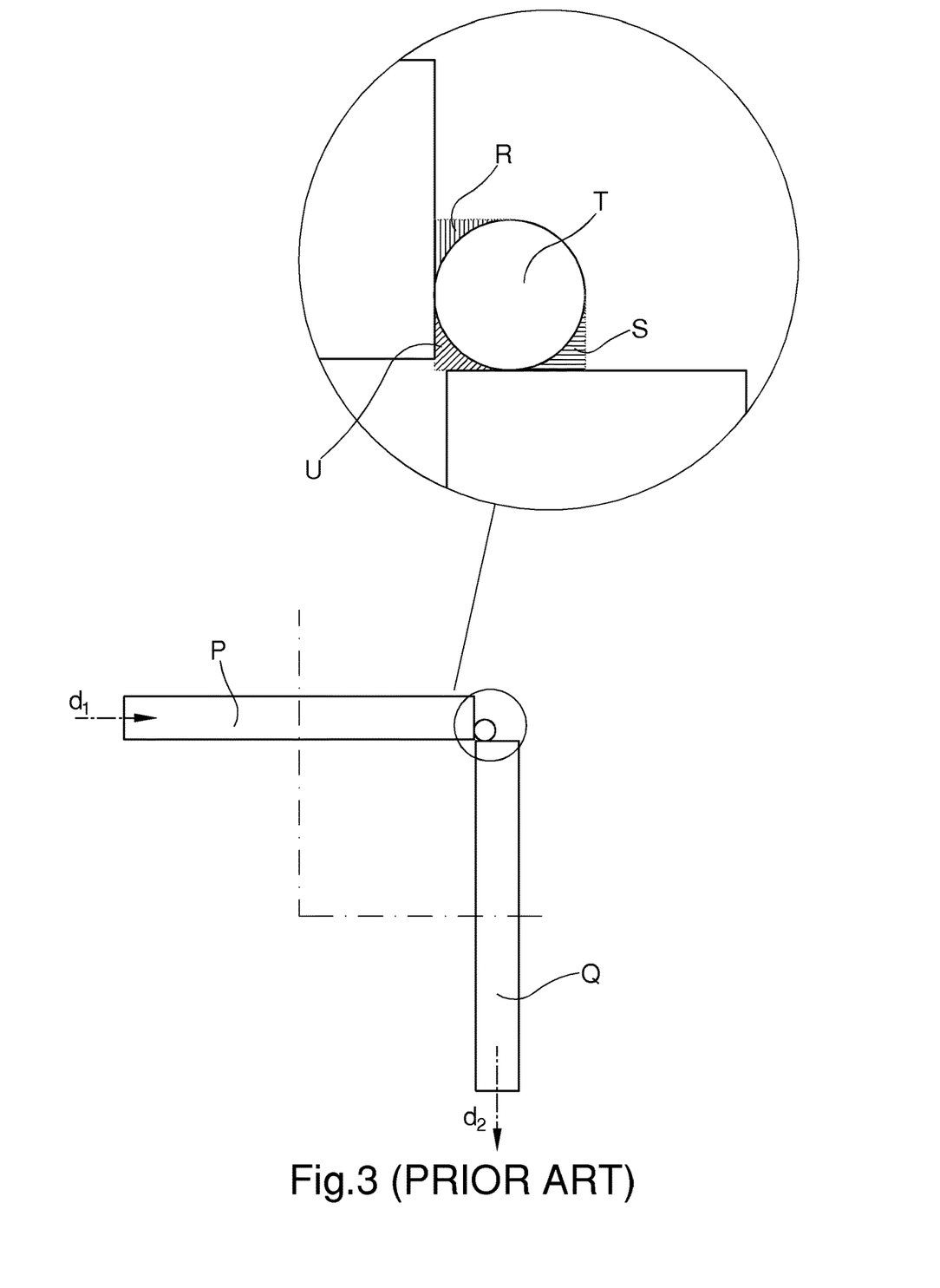

In order to better appreciate this condition, FIG. 3 shows a cross section made on a plane containing the axes of the pulleys of the transmission of the second type of FIG. 2 according to the prior art. Such a transmission is provided with a first pulley P having a vertical axis incident with the horizontal axis of a second pulley Q. FIG. 3 also shows an enlargement of the transmission at the passage area of the cable between one pulley and the other, in which the projection is shown on the cross-sectional plane of the portion of the cable wrapping on the pulley P. This projection is shown in the figure by the areas R and U. It is therefore clear that any retaining element present on the pulley Q which occupies the area U would interfere with the cable itself, thus producing premature wear of both the cable and the retaining material. The same considerations apply to any retaining elements formed on the pulley P.

Therefore, since it is not possible to fit retaining elements on the surface of the pulleys with sufficient effectiveness to prevent their slipping off the pulleys, the solutions of the prior art require that a gap value significantly smaller than the cable diameter be ensured under all working conditions. As anticipated above, maintaining a minimum gap is particularly difficult due to the possible deformations of the axes supporting the pulleys and/or clearances of the relevant bearings supporting the pulleys.

Finally, with regard to the overall dimensions of the transmission, it should be noted that it is univocally determined by the radii of the pulleys P and Q, being the greater the larger the radii of the latter.

DESCRIPTION OF THE INVENTION

In view of the problems listed above, the present invention allows, by the addition of one or more intermediate pulleys, making transmissions which are stronger, i.e., more effective in preventing the cable from slipping off and, at the same time, more compact. These advantages are obtained without the need for the insertion of expensive supporting elements of the pulleys.

Thus, the present invention relates to a mechanical transmission for robotic devices which is able to overcome the drawbacks of the prior art described above.

BRIEF DESCRIPTION OF THE DRAWINGS

Other characteristics and advantages of the present invention will become more apparent from the description of a preferred, but not exclusive, embodiment of a mechanical transmission, illustrated by way of an indicative, yet non-limiting example, in the accompanying tables of drawings wherein.

EMBODIMENTS OF THE INVENTION

With particular reference to such figures, reference numeral 1 globally indicates a mechanical transmission for robotic devices configured for torque/force drives covered by the present invention.

Figure 10:
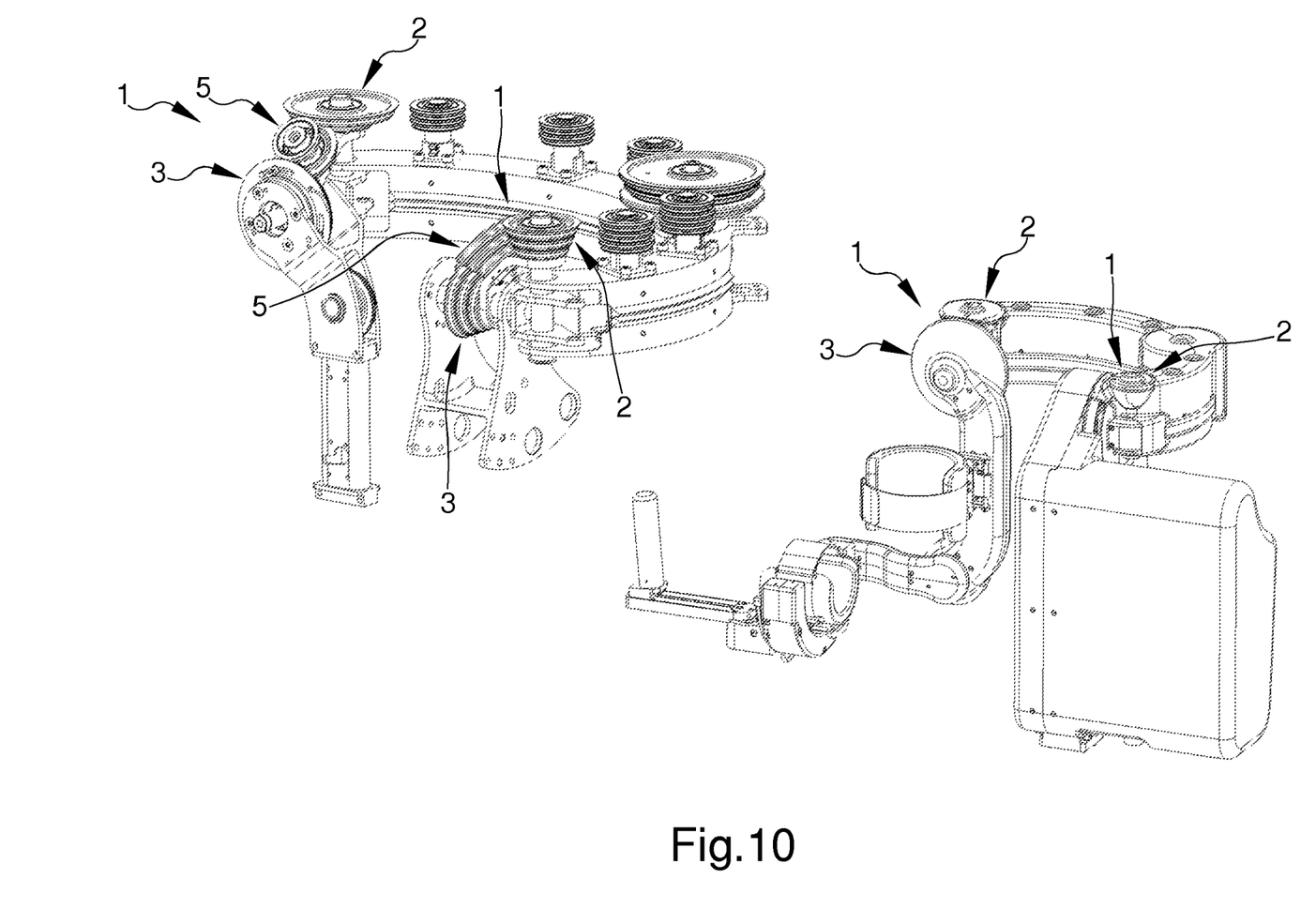
FIG. 10 is a perspective view of an exoskeleton provided with the mechanical transmissions covered by the present invention.

FIG. 10 shows the transmission 1 according to a first embodiment fitted inside part of an anthropomorphic exoskeleton for an upper limb of a user having the purpose of varying the direction of a transmission element 4 by a predefined deflection angle α. In particular, the exoskeleton comprises a supporting frame configured to support several pulleys, e.g., oriented at parallel axes of rotation, and the transmission 1 covered by the present invention. In detail, the transmission 1 is configured to receive at least one transmission element 4 and divert it between an input direction $d_1$, lying on an input plane, and an output direction $d_2$, lying on an output plane.

The transmission 1 comprises, at the input direction $d_1$ of the transmission element 4, an input pulley 2 configured to rotate around a first axis of rotation $a_1$ orthogonal to the input direction $d_1$ and to be at least partly wrapped by the transmission element 4 and, at the output direction $d_2$, an output pulley 3 configured to rotate around a second axis of rotation $a_2$ orthogonal to the output direction $d_2$ and to be at least partly wrapped by the transmission element 4. In detail, the second axis of rotation $a_2$ is non-parallel to the first axis of rotation $a_1$.

In particular, each pulley 2, 3 has a perimeter surface adapted to be at least partly wrapped by the transmission element 4. The transmission element 4 may be, e.g., a cable, a belt or any flexible tie rod. Preferably, the cable is of the metal type.

Conveniently, the pulleys 2, 3 are arranged with their axes of rotation $a_1$, $a_2$ inclined to each other by a predefined angle defining the deflection angle α. In other words, the first axis of rotation $a_1$ and the second axis of rotation $a_2$ form, between them, a deflection angle α having predefined width. In particular, the planes of rotation of the input pulley 2 and of the output pulley 3 are arranged substantially parallel to the input plane and to the output plane of the transmission 1, respectively.

Advantageously, the transmission 1 comprises at least one intermediate pulley 5 positioned between the input pulley 2 and the output pulley 3 and configured to rotate around a third axis of rotation $a_3$, lying in one of the planes identified by the axes $a_1$, $a_2$.

In one or more versions, the third axis of rotation $a_3$ lies in one of the planes identified by the first axis of rotation $a_1$ and by the second axis of rotation $a_2$. In one or more versions, the third axis of rotation $a_3$ lies in one of the planes identified by the first axis of rotation $a_1$ or by the second axis of rotation $a_2$. The intermediate pulley 5 is configured to be partly wrapped by the transmission element 4.

Advantageously, the intermediate pulley 5 is configured to rotate around its own axis of rotation $a_3$ inclined with respect to one of the two axes of rotation $a_1$, $a_2$ by an angle β having smaller width than the width of the deflection angle α. Furthermore, the planes of rotation of the pulleys 2, 3, 5 are non-parallel. Preferably, the intermediate pulley 5 is arranged according to an orientation such that the angle β of the third axis of rotation $a_3$ has a value comprised between 30% and 70% of the deflection angle α, preferably 50%.

Conveniently, the transmission 1 is with incident axes, i.e., the pulleys 2, 3, 5 are arranged such that their axes of rotation $a_1$, $a_2$, $a_3$ are substantially incident at a point of intersection O (so-called "center of the transmission").

Conveniently, the intermediate pulley 5 is spaced apart from each adjacent pulley 2, 3 by a gap G having smaller dimension than the diameter of the cable 4. In detail, the term "gap" means the minimum distance between the perimeter surfaces of two consecutive pulleys.

Figures 7, 8, 9:
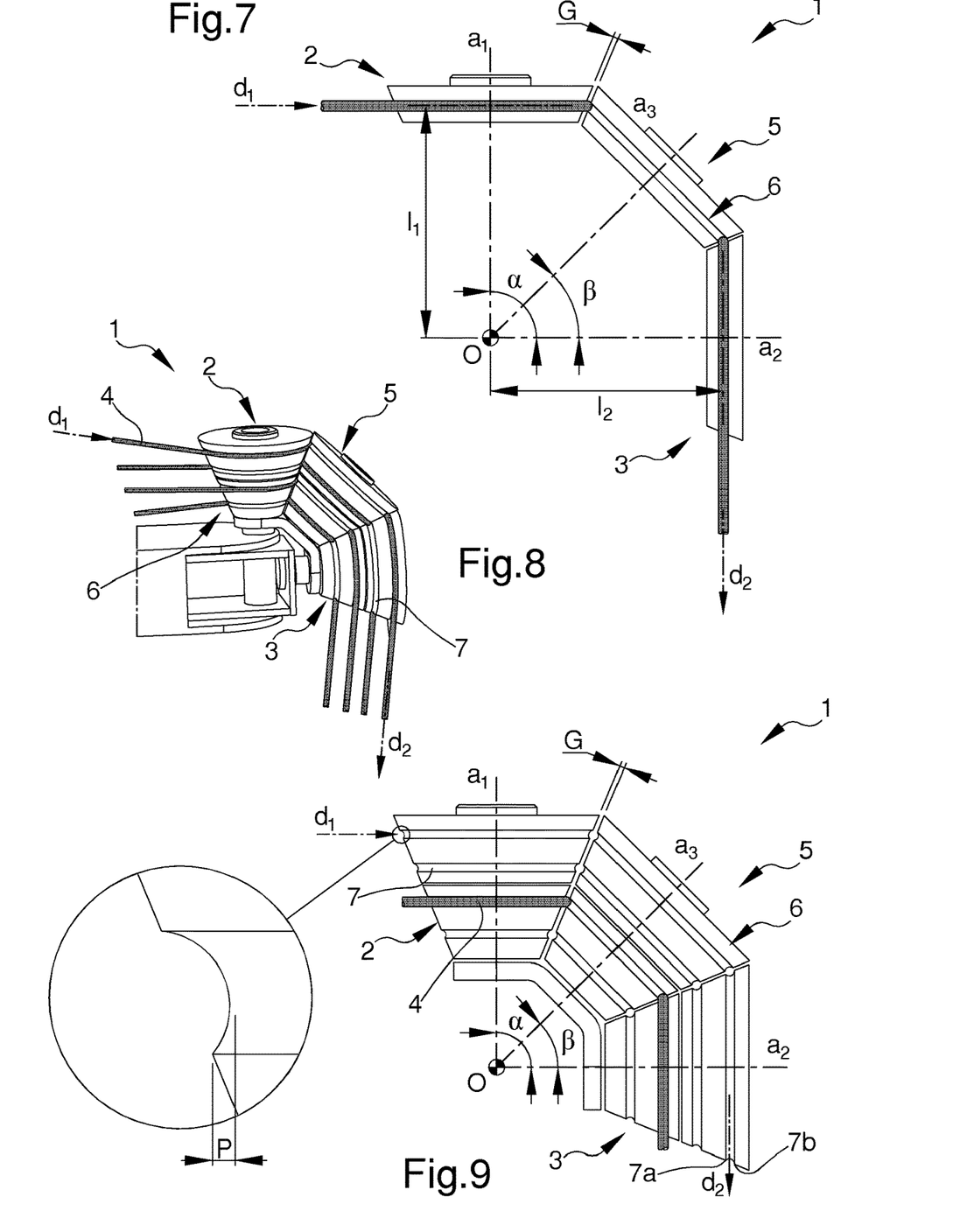
FIG. 7 is an orthogonal view to the plane identified by the axes of the transmission covered by the present invention in which there is only one branch of a drive.
FIG. 8 is a perspective view of an embodiment of the transmission covered by the present invention, relating to the case of multiple drives with a taut cable.
FIG. 9 is an orthogonal view to the plane identified by the axes of the transmission covered by the present invention, relating to the case of multiple drives with a taut cable.

As shown in FIGS. 7 and 8, the pulleys 2, 3, 5 may have a substantially conical shape, but the possibility of manufacturing the transmission with cylindrical pulleys cannot be ruled out.

In the embodiments of FIGS. 8 and 9, the pulleys 2, 3, 5 may have a substantially conical or truncated cone shape. In this way, the gap G between the intermediate pulley 5 and the input and output pulleys 2, 3 can be made substantially constant along the entire length of the generators of the pulleys 2, 3, 5 lying in the plane containing the two axes of the transmission.

Preferably, each pulley 2, 3, 5 is wrapped by only one branch of a drive (e.g., the forward branch).

Conveniently, in order to make the transmission simpler and more compact, each pulley 2, 3, 5 may be wrapped by both the forward branch and the return branches of the same drive.

According to alternative embodiments, the pulleys 2, 3, 5 may, however, also have different shapes, e.g. substantially discoidal or cylindrical. The lying planes of the cable of the branches of a drive on the pulleys 2 and 3 enable the drive distances of the transmission 1 to be defined, i.e. the distances $l_1$, $l_2$ between the lying planes and the center of the transmission 1 (see FIG. 7).

Conveniently, each pulley 2, 3, 5 may comprise one or more retaining elements 6 configured to keep the cable 4 at least partly wrapped on a plane orthogonal to the axis of rotation of the pulley 2, 3, 5.

In the embodiment shown in FIG. 9, each pulley 2, 3, 5 comprises a pair of retaining elements 6 configured to receive both branches 4 (forward branch and return branch) of a drive.

Figure 4:
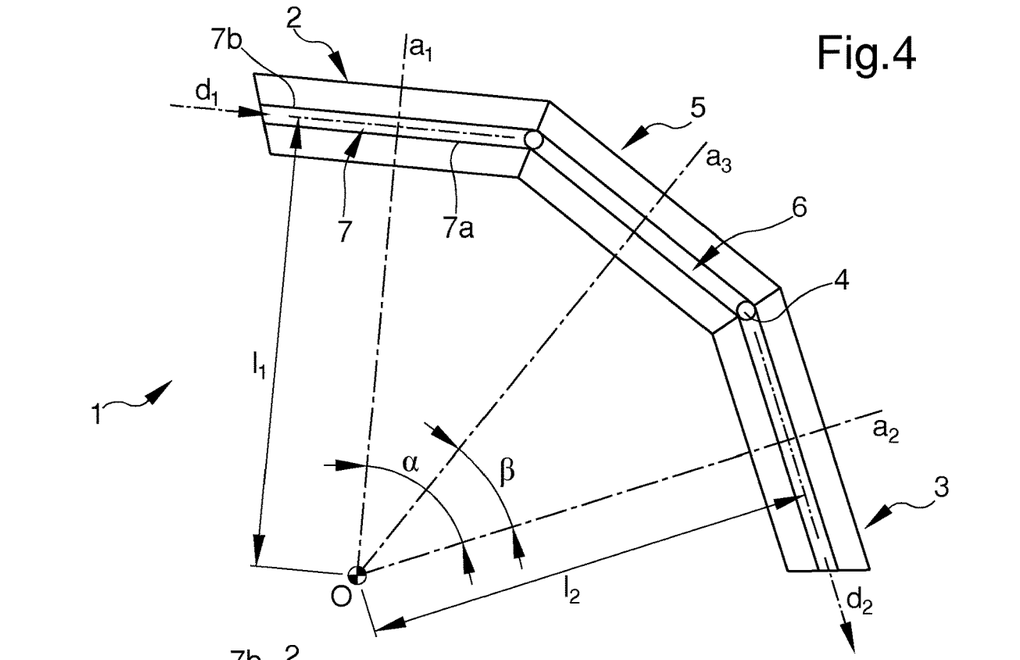
FIG. 4 is a schematic view of one possible embodiment of the mechanical transmission according to the present invention.
Figure 5:
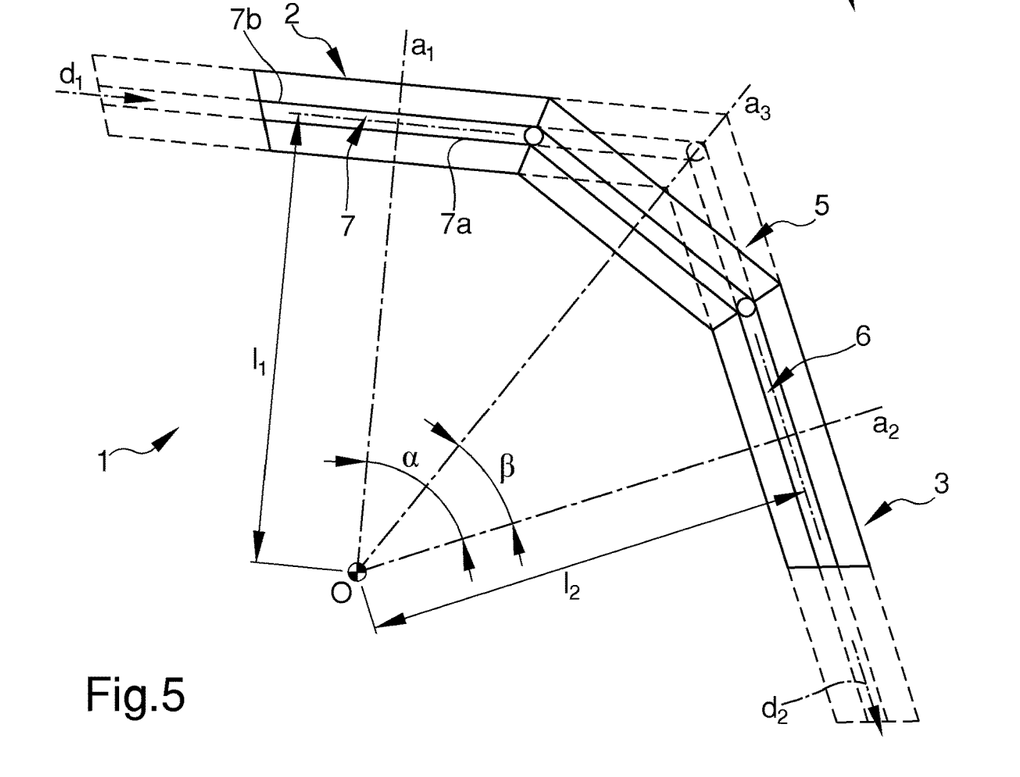
FIG. 5 shows the schematic view of FIG. 4, with the solution of the prior art being superimposed by hatching, which demonstrates the smaller dimensions of the transmission covered by the present invention compared to that of the prior art.

As shown in FIGS. 4 and 9, the retaining element 6 may comprise at least one groove 7 made along the perimeter surface of the pulley and configured to receive and support the cable 4 of the drive. For this purpose, the groove 7 has a profile of a substantially complementary shape to the cross-section of the driving cable. The possibility cannot however be ruled out of using different retaining elements 6, such as, e.g., an appendage, a flange, or an appropriately portion formed on the surface to achieve a coupling by shape between the cable 4 and the pulley.

Referring to the example in FIG. 9, each groove 7 comprises a lower edge 7a and an upper edge 7b arranged in a proximal and distal position, respectively, to the center O of the transmission 1.

In detail, at least the lower edge 7a of the intermediate pulley 5 is arranged, at the respective gap, so as to be substantially aligned with the lower edge 7a of the input pulley 2 and of the output pulley 3 to facilitate the passage of the cable 4 between the pulleys 2, 3, 5.

As described above, the conformation of the groove 7 should be such as to allow the passage of the cable 4 from one pulley to another. In particular, the groove 7 may be characterized by its depth P defined as the distance between the projections of the bottom of the groove 7 and of the lower edge 7a on the plane of rotation of the corresponding pulley 2, 3, 5.

The maximum depth P with which the groove 7 can be made to allow the cable 4 to pass from one pulley to another depends on the angle of inclination between the axes of rotation of the consecutive pulleys: in particular, the smaller the angle of inclination between two consecutive pulleys, the greater the depth P of the groove 7 can be.

Figure 6:
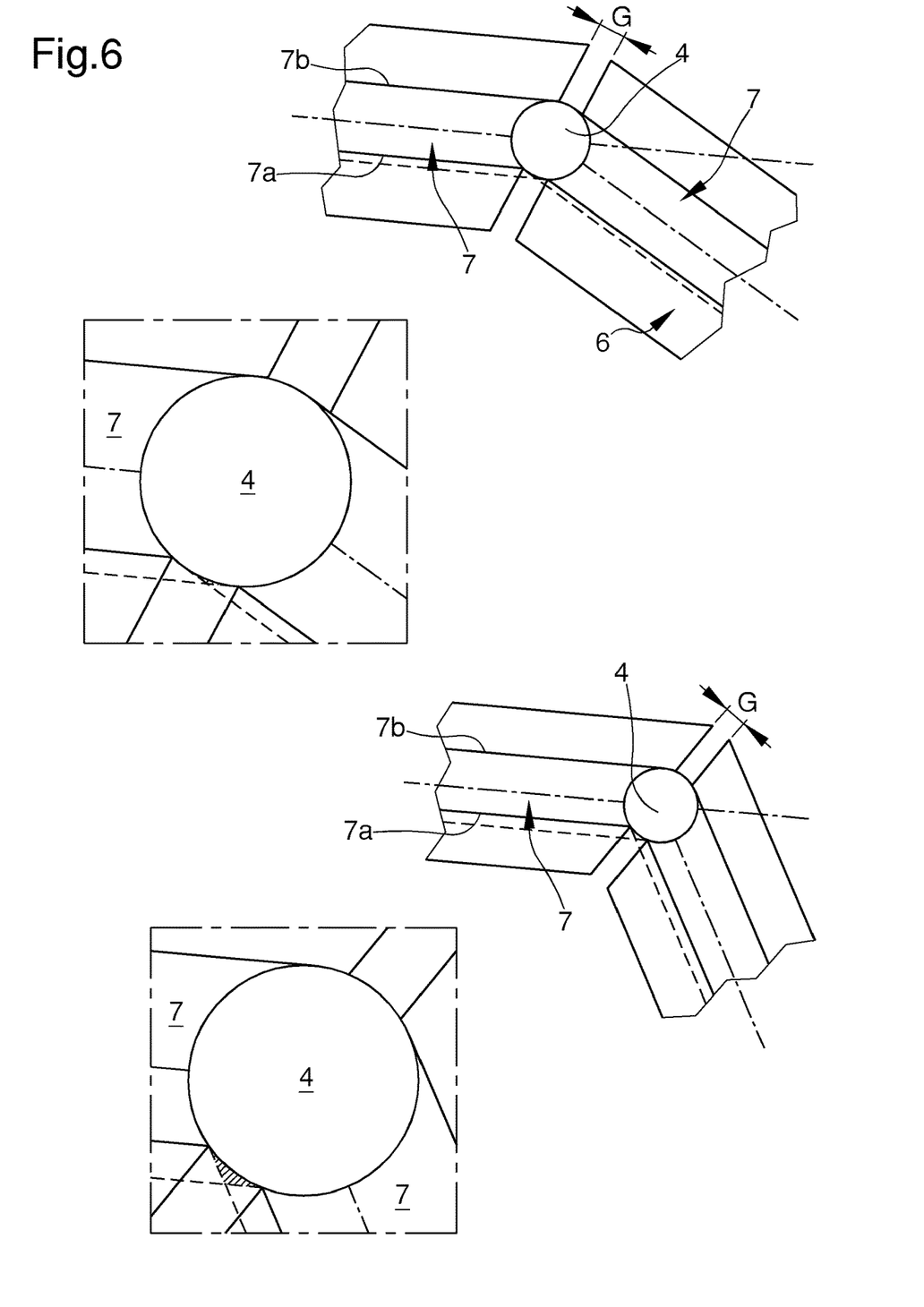
FIG. 6 shows further schematic views of the mechanical transmission covered by the present invention in which it is demonstrated that, by varying the angles of inclination between two consecutive pulleys, the size of the retaining elements varies.

Advantageously, according to the present invention, the introduction of one or more intermediate pulleys 5 allows decreasing the angle of inclination between the axes of rotation of the consecutive pulleys with respect to the prior art. In this way, it is possible to make, the deflection angle being the same, deeper grooves 7 which make the transmission extremely sturdy. FIG. 6 shows the reduction in the size of the retaining elements as the deflection angle increases. In particular, it is ascertained that the decrease of the deflection angle corresponds to an increase in the size of the retaining elements 6.

In a preferred embodiment, the axes of the pulleys 2, 3, 5 lie substantially in the same plane.

In one embodiment, shown in FIGS. 7, 8 and 9, the transmission 1 has a deflection angle α substantially greater than or equal to 90°.

In such an embodiment, conveniently, the intermediate pulley 5 is arranged with the axis of rotation $a_3$ inclined by an angle β substantially equal to 45° with respect to the axis of rotation $a_2$. In different embodiments, the axis of rotation $a_3$ is inclined with respect to one of the two axes by an angle β having always smaller width than the width of the deflection angle α.

Preferably, each pulley 2, 3, 5 rotates with respect to the respective shaft by means, e.g., of the use of one or more bearings.

In use, the cable is 4 partly wrapped alternately on the pulleys 2, 3, 5. For example, the cable 4 may be wrapped clockwise on the first pulley 2 and on the second pulley 3 and counterclockwise on the intermediate pulley 5.

In one or more embodiments, not shown in the figures, the transmission 1 may comprise a plurality of intermediate pulleys 5 positioned between the input and output pulleys 2, 3. In such a case, the intermediate pulleys 5 are arranged consecutively between the input pulley 2 and the output pulley 3. Conveniently, each intermediate pulley 5 is arranged with its own axis of rotation $a_3$ inclined with respect to the axis of rotation of one of the adjacent pulleys by an angle preferably comprised between 30% and 70% of the deflection angle α. For example, if the deflection angle is 90° and comprises a pair of intermediate pulleys 5, the latter may be arranged with the axis of rotation $a_3$ inclined by about 30° with respect to the axis of rotation of one of the adjacent pulleys.

FIG. 10 shows an anthropomorphic exoskeleton for the upper limbs and, in detail, the portion relating to the shoulder articulation. The exoskeleton is provided with at least one first limb and one second limb connected to each other by means of at least one rotoidal torque which allows the second limb at least one rotational movement in a predefined plane of rotation. In the embodiment shown in FIG. 10, the two limbs are connected via an articulation provided with three rotational degrees of freedom.

The exoskeleton is also provided with at least one actuator for the movement of the various articulations, connected to the latter by means of one or more transmission elements 4.

In said portion relating to the shoulder articulation, two transmissions 1 have been made according to the present invention.

The building of the transmissions covered by the present invention into the implementation of an exoskeleton for upper limbs has shown that the described invention achieves the intended objects.

In fact, the transmissions covered by the present invention have been shown to be more robust to cable slipping off than those of the prior art for at least the following reasons:
the insertion of an intermediate pulley has made it possible to reduce the diameter of the pulleys, thus allowing greater stability of the gap value between the consecutive pulleys with the same clearance and deformations of their supporting elements (mainly shafts and bearings). Consequently, it is possible to make less restrictive machining tolerances of the transmission components which determine the clearance between their couplings and to tolerate greater deformations of the supporting elements of the pulleys. This last condition allows, the loads imposed by the drive being the same, lightening the elements themselves with evident benefits in terms of overall dimensions and mass of the transmission. This last aspect is advantageous both from the point of view of the reduction of the overall costs of the transmission and from the point of view of the reduction of the moving masses.

The reduction of the angle comprised between the axes of rotation of the consecutive pulleys allows making more effective retaining elements. In particular, the presence of an intermediate pulley allows a geometric arrangement of the pulleys which allows manufacturing deeper grooves, thus ensuring greater strength of the transmission against cable slipping off.

Moreover, the transmission made according to the present invention allows using pulleys with a smaller diameter than those of the prior art with the same drive distances and deflection angle resulting, therefore, more compact.

In actual facts, the minimum value of these distances is imposed by the overall dimensions of the components of the articulation that has to be crossed by the cable drive through the transmission. Such components are, e.g., the links, shafts and bearings making up the articulation.

On the other hand, in the solution of the prior art, the radius of the pulleys is fixed by the deflection angle and the drive distances. In particular, in the case of a deflection angle equal to 90°, the use of pulleys having radii substantially equal to the drive distances is required.

The invention claimed is:

1. An anthropomorphic robotic exoskeleton physically interacting with a human being comprising:
   a mechanical transmission for robotic devices, said mechanical transmission including:
   a transmission element intended to be diverted between an input direction and an output direction,
   an input pulley configured to rotate around a first axis of rotation orthogonal to said input direction and to be at least partly wrapped by both the forward branch and the return branches of said transmission element,
   an output pulley configured to rotate around a second axis of rotation orthogonal to said output direction and to be at least partly wrapped by said transmission element, said second axis of rotation being non-parallel to said first axis of rotation,
   wherein said first axis of rotation and said second axis of rotation form between them a deflection angle having predefined value, and
   one intermediate pulley positioned between said input pulley and said output pulley and configured to rotate around a third axis of rotation, lying in one of the planes identified by said axes and inclined with respect to one of said axes of rotation by an angle having smaller value than the value of said deflection angle, and to be partly wrapped by said transmission element,
   wherein the planes of rotation of said pulleys are non-parallel,
   wherein said pulleys have a substantially cone or truncated cone shape, and
   wherein the axes of the input, output and intermediate pulleys lie in the same plane.

2. The anthropomorphic robotic exoskeleton according to claim 1, wherein said intermediate pulley is arranged according to an orientation such that said angle of said third axis of rotation has a value between 30% and 70% of said deflection angle.

3. The anthropomorphic robotic exoskeleton according to claim 1, wherein said intermediate pulley is spaced apart from each of said pulleys by a gap having smaller dimension than the diameter of said transmission element.

4. The anthropomorphic robotic exoskeleton according to claim 1, wherein said deflection angle has greater value than or is equal to 90°.

5. The anthropomorphic robotic exoskeleton according to claim 1, wherein each of said pulleys comprises one or more retaining elements configured to keep said transmission element at least partly wrapped on a plane orthogonal to said axis of rotation of said pulley.

6. The anthropomorphic robotic exoskeleton according to claim 5, wherein said retaining element comprises at least one groove made along the perimeter surface of each of said pulleys.

* * * * *